(12) United States Patent
Juzswik et al.

(10) Patent No.: US 7,714,707 B2
(45) Date of Patent: May 11, 2010

(54) SYSTEM FOR MEASURING LIFE EXPECTANCY OF A TIRE CONDITION MONITORING SYSTEM

(75) Inventors: David L. Juzswik, Commerce, MI (US); Stephen Wieland, Commerce Township, MI (US); Michael G. Oszust, Davisburg, MI (US)

(73) Assignees: TRW Automotive U.S. LLC, Farmington Hills, MI (US); Michelin Recherche et Techniques S.A., Granges-Paccot (CH)

( * ) Notice: Subject to any disclaimer, the term of this patent is extended or adjusted under 35 U.S.C. 154(b) by 310 days.

(21) Appl. No.: 11/804,506

(22) Filed: May 18, 2007

(65) Prior Publication Data
US 2008/0284577 A1 Nov. 20, 2008

(51) Int. Cl. *B60C 23/00* (2006.01)
(52) U.S. Cl. .................. 340/447; 340/445; 73/146.4
(58) Field of Classification Search ......... 340/441–447; 73/146.5, 146.2, 146.3, 146.4
See application file for complete search history.

(56) References Cited

U.S. PATENT DOCUMENTS

| | | | |
|---|---|---|---|
| 4,311,985 A | 1/1982 | Gee et al. | |
| 4,316,176 A | 2/1982 | Gee et al. | |
| 5,285,189 A | 2/1994 | Nowicki et al. | |
| 5,717,376 A | 2/1998 | Wilson | |
| 5,827,957 A * | 10/1998 | Wehinger | 73/146.3 |
| 5,900,808 A * | 5/1999 | Lebo | 340/442 |
| 5,945,908 A | 8/1999 | Nowicki et al. | |
| 5,977,870 A * | 11/1999 | Rensel et al. | 340/447 |
| 6,232,875 B1 | 5/2001 | DeZorzi | |
| 6,369,712 B2 | 4/2002 | Letkomiller et al. | |
| 6,817,237 B2 | 11/2004 | Katou et al. | |
| 6,832,514 B2 | 12/2004 | Anderson et al. | |
| 6,982,636 B1 | 1/2006 | Bennie et al. | |
| 7,013,721 B2 * | 3/2006 | Keller et al. | 73/146 |
| 2002/0075146 A1 | 6/2002 | Saheki | |
| 2002/0113692 A1 | 8/2002 | Normann et al. | |
| 2002/0167400 A1 | 11/2002 | Tsujita et al. | |
| 2003/0145650 A1 | 8/2003 | Juzswik et al. | |
| 2004/0127206 A1 | 7/2004 | Van Bosch et al. | |
| 2005/0156723 A1 | 7/2005 | Fujii | |
| 2006/0017554 A1 | 1/2006 | Stewart et al. | |

* cited by examiner

*Primary Examiner*—Anh V La
(74) *Attorney, Agent, or Firm*—Tarolli, Sundheim, Covell & Tummino LLP

(57) ABSTRACT

A system (10) is provided for monitoring a remote tire monitoring sensor. The system includes a tire-based unit (16) having a sensor (42) and transmitter (44) that receives power from a power supply (18) located within the tire-based unit (16). The transmitter (44) transmits a signal (22) relating to a parameter measured by the sensor (42). The system (10) further includes a controller (36) that evaluates the life of the power supply (18) by monitoring energy usage of the power supply (18) by counting the number of occurrences in which the energy usage is above a prescribed amount (59) and comparing the number of occurrences to an energy threshold (60).

14 Claims, 4 Drawing Sheets

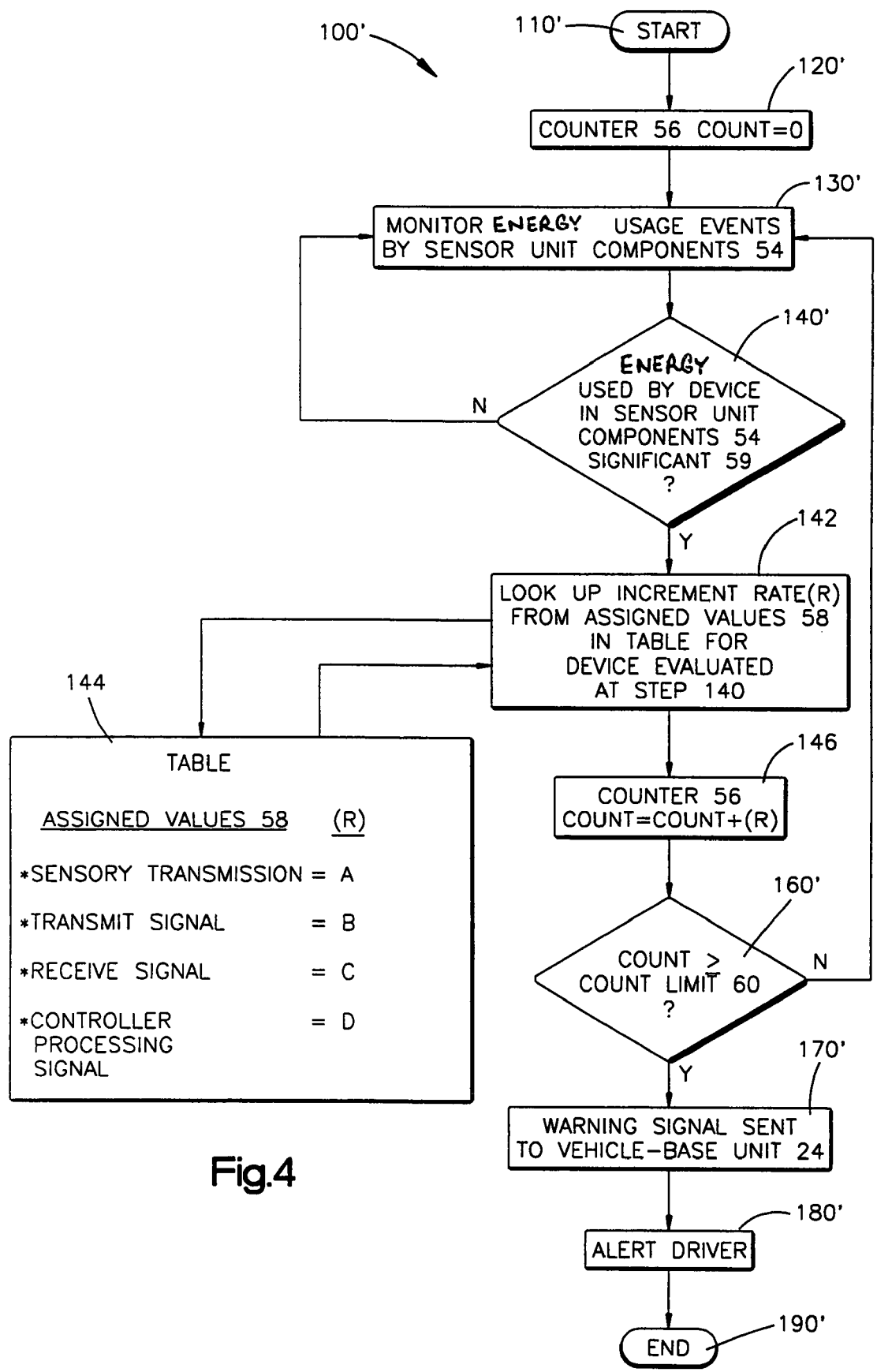

SYSTEM FOR MEASURING LIFE EXPECTANCY OF A TIRE CONDITION MONITORING SYSTEM

TECHNICAL FIELD

The present invention is directed toward an apparatus and method for determining the life expectancy of a power supply for powering a remote tire condition monitoring system located within a vehicle tire.

BACKGROUND OF THE INVENTION

Numerous tire condition monitoring systems have been developed to detect various parameters within the tire, for example temperature and pressure. A tire condition monitoring system typically includes a sensor, an internal power source, and a communications link. The sensor provides measured tire parameter information to a central receiver through the communications link. The communications link may be a wireless link that sends information to the central receiver and, when necessary, notifies the operator of the vehicle, for example, when the air pressure drops below a threshold pressure value.

Because the tire condition monitoring systems include an internal power source, such as a battery, it has a finite life period. Over the course of the vehicle's lifetime, the vehicle may need to have one or more tire condition monitoring systems replaced. Replacement is required after the tire condition monitoring system no longer has sufficient power or the required energy to sustain the system's functionality.

SUMMARY OF THE INVENTION

The present invention is directed to a system for measuring the life expectancy of a tire condition monitoring system. The system, in accordance with one example embodiment of the present invention, includes a tire-based unit having a sensor and transmitter that receives power from a power supply located within the tire-based unit. The transmitter tire-based unit transmits a signal relating to a tire parameter measured by the sensor. The system further includes a controller that evaluates the life of the power supply by monitoring energy usage of the power supply by counting the number of occurrences in which the energy usage is above a prescribed amount and comparing the number of occurrences to a threshold.

The present invention also relates to a system for predicting the useful life of a power supply located within a tire condition monitoring unit. The system, in accordance with another example embodiment of the present invention, includes at least one sensor used to measure at least one tire parameter, a transmitter for transmitting signals relating to the tire parameters measured by the sensor, and a controller for controlling the sensor and transmitter. The controller further includes an algorithm for predicting the useful life of the power supply by tracking the energy usage for each operation performed by the plurality of components.

The present invention further relates to a method of predicting the useful life of a power supply located in a tire condition monitoring system. The method, in accordance with an example embodiment of the present invention, includes monitoring energy usage of operations performed by a plurality of components located within the tire condition monitoring system and referencing a respective known value for the monitored energy usage for each operation performed by the plurality of components. The known values are in an algorithm located in a controller of the tire condition monitoring system. The method further includes the steps of incrementing a counter for each known value referenced to an incremented count value and comparing the incremented count value to a count limit.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 4 is a flow chart of another illustrated control process performed within a tire condition sensor unit in accordance with another example embodiment of the present invention.

DETAILED DESCRIPTION

Figure 1:
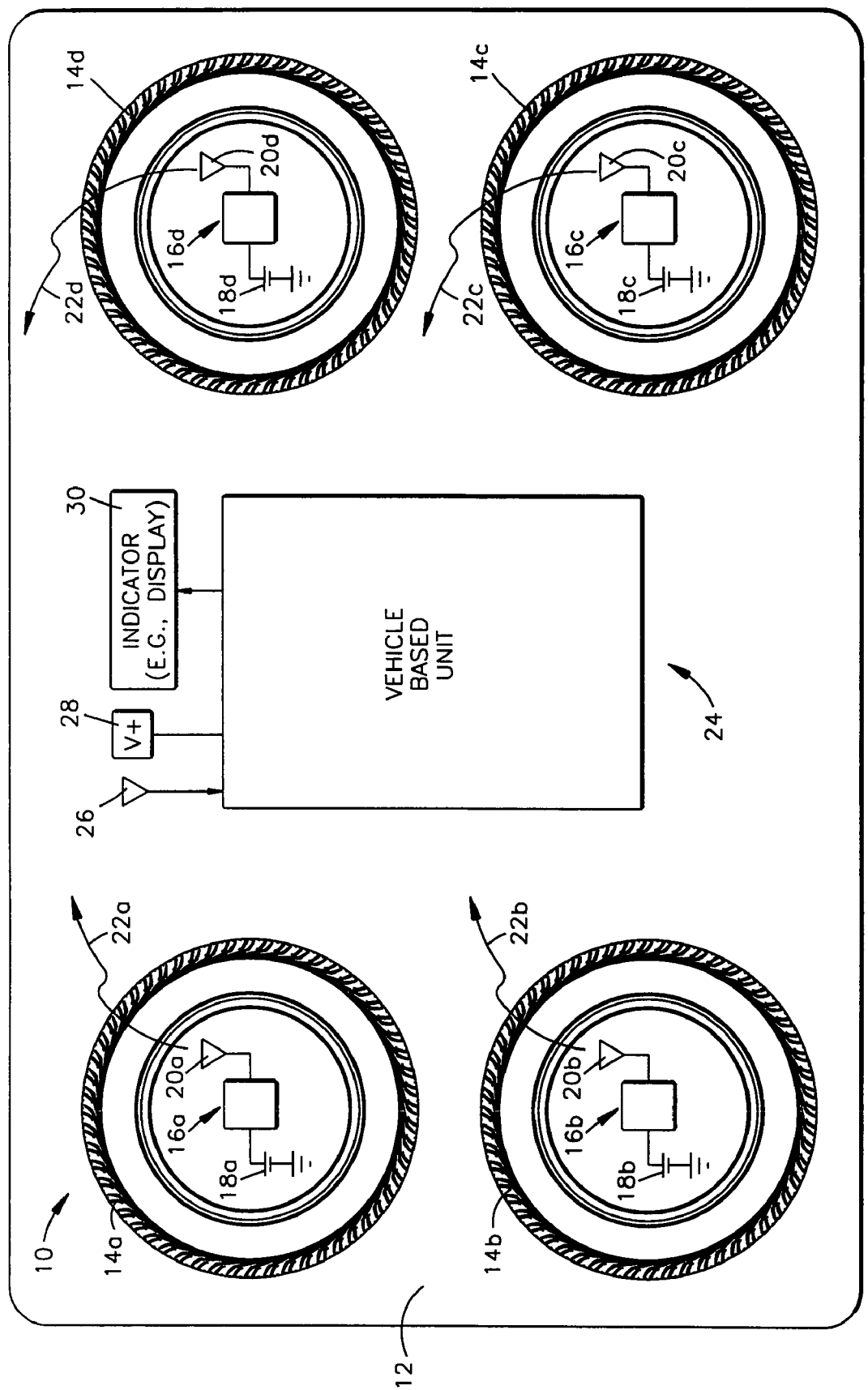
FIG. 1 is a schematic block diagram of a vehicle having a tire condition communication system with a plurality of tire condition sensor units in accordance with an example embodiment of the present invention.

Referring to FIG. 1, a tire condition communication system 10 in accordance with an example embodiment of the present invention is schematically shown within an associated vehicle 12. The vehicle 12 has a plurality of inflatable tires, 14a, 14b, 14c, and 14d. It is to be appreciated that the vehicle 12 may have a different number of tires. For example, the vehicle 12 may include a fifth tire (not shown) that is stored as a spare tire or more tires such as would occur in a truck.

The system 10 includes a plurality of tire condition sensor units (e.g., 16a) for sensing one or more tire conditions at the vehicle tires (e.g., 14a). Each tire 14a, 14b, 14c, and 14d have an associated tire condition sensor unit 16a, 16b, 16c, and 16d, respectfully, within the vehicle 12, and may be extended to include additional tires, for example a spare tire (not shown). In the illustrated example, all of the tire condition sensor units 16a, 16b, 16c, and 16d have the same components. Identical components are identified with identical reference numerals, with different alphabetic suffixes. It is to be appreciated that, except as noted, all of the tire condition sensor units 16a, 16b, 16c, and 16d function in the same manner. For brevity, operation of only one of the tire condition sensor unit (e.g., 16a) is discussed in detail, with the understanding that the discussion is generally applicable to the other tire condition sensor units (e.g., 16b, 16c, and 16d).

Each tire condition sensor unit (e.g., 16a) includes a power supply (e.g., 18a), such as a battery, that provides electrical energy to various components within the respective sensor unit. The electrical energy enables the tire condition sensor unit (e.g., 16a) to energize a transmitting antenna (e.g., 20a) so as to emit a frequency signal (e.g., 22a), for example, a radio frequency signal, that conveys one or more sensed conditions along with other appropriate information, such as tire identification, etc., to a central, vehicle-based unit 24. Specifically, a radio frequency receiving antenna 26 receives the signal (e.g., 22a) from the tire condition sensor unit (e.g., 16a) and the conveyed information is processed by the vehicle-based unit 24. In one example, the system 10 is designed to operate with the signals (e.g., 22a) in the radio frequency range. Thus, each antenna (e.g., 20a) in combination with the receiving antenna 26 comprises part of a means for communication from the respective tire condition sensor unit (e.g., 16a) to the vehicle-based unit 24.

The vehicle-based unit 24 includes, in accordance with one example embodiment of the present invention, a microcomputer. Alternatively, the vehicle-based unit 24 could include an application-specific-integrated-circuit ("ASIC") formed from discrete circuitry, or any other type of control circuitry arranged to achieve the functions described below.

A vehicle power supply (e.g., a vehicle battery) 28, which is operatively connected to the vehicle-based unit 24, provides electrical energy to permit performance of the signal processing and the like of the vehicle-based unit 24. The vehicle-based unit 24 utilizes the processed information to provide information to a vehicle operator via an indicator device 30. In one example embodiment of the present invention, the indicator device 30 may be a visual display that is located on an instrument panel of the vehicle 12. Accordingly, the vehicle operator is apprised of the sensed condition(s) at each of the tires (e.g., 14a).

It is to be noted that the sensed condition may be any condition at the tire (e.g., 14a). For example, the sensed condition may be inflation pressure of the tire (e.g., 14a), temperature of the tire, motion of the tire, or even any other diagnostic condition of the tire condition sensor unit (e.g., 16a) itself.

In the illustrated example embodiment of FIG. 1, an identification system is capable of discerning the origin of the transmission signal 22a, 22b, 22c, and 22d, corresponding tire condition sensor unit 16a, 16b, 16c, and 16d, and its respective tire 14a, 14b, 14c, and 14d, including the spare tire (not shown). Accordingly, the vehicle operator is made aware of the tire condition of the certain tire, without having to separately determine which tire is associated with the tire condition.

The identification system could be any type known by those skilled in the art without departing from the spirit and scope of the claimed invention. The identification system, for example could be a stimulus-based system where an initiation signal is transmitted from antennas connected to the vehicle-based unit 24 to a selectively chosen tire (e.g., 14a). The initiation signal for the selectively chosen tire (e.g., 14a) stimulates the associated tire condition sensor unit (e.g., 16a), and as a result transmits a parameter transmission signal (e.g., 22a) from the known tire location to the vehicle-based unit 24. Thus, the information that is provided to the vehicle operator results from a known tire location (e.g., left front). Alternatively, the identification system could be a type of system where the location of the tire is ascertained in the data packet that is randomly transmitted (without stimuli) by the tire condition sensors' 16a, 16b, 16c, and 16d respective transmission signals 22a, 22b, 22c, and 22d. For example, the data packet in the transmission signal 22a, 22b, 22c, and 22d includes a signature relating to the respective tire condition sensor unit 16a, 16b, 16c, and 16d and tire 14a, 14b, 14c, and 14d from which the transmission signal was sent (e.g., left front).

Figure 2:
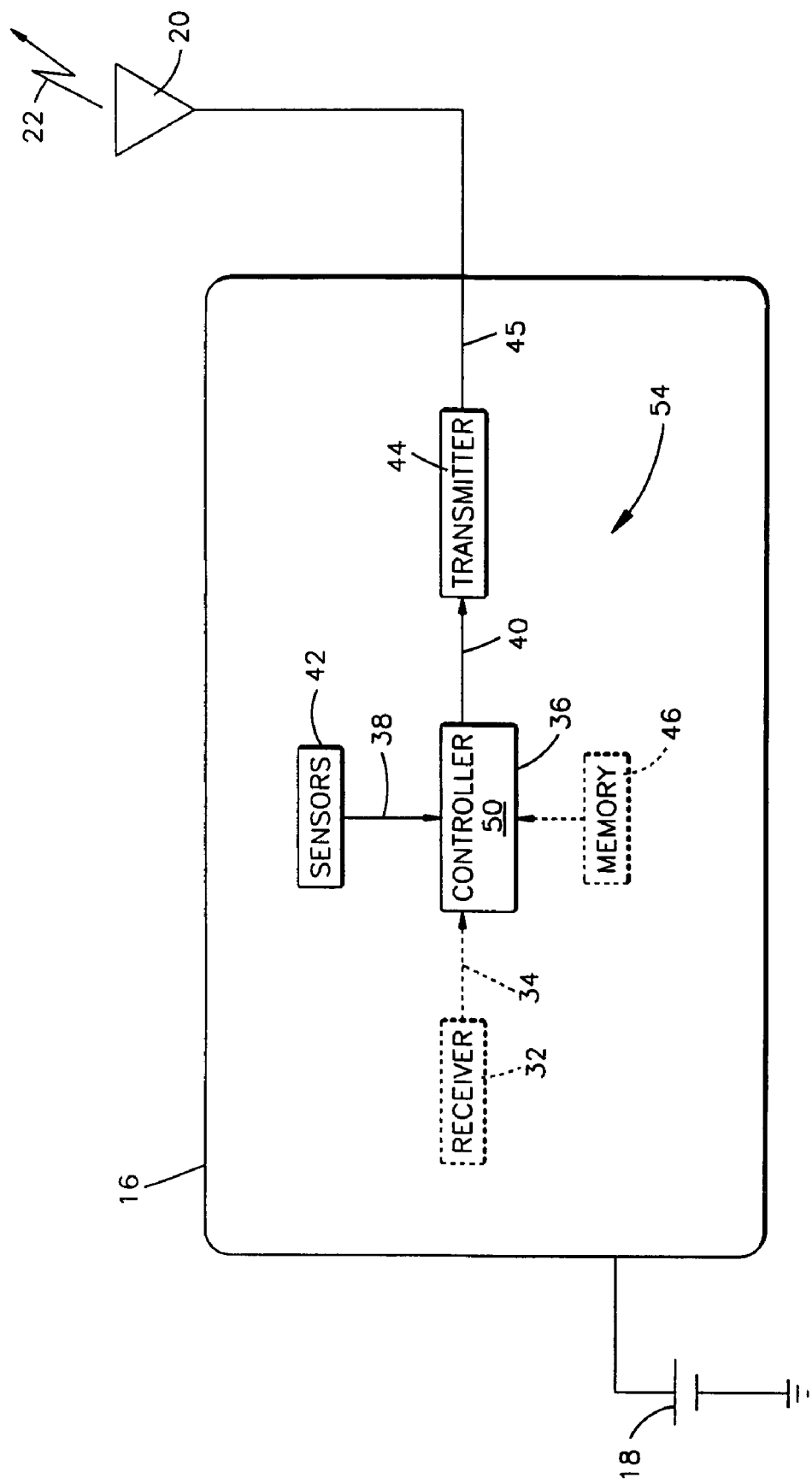
FIG. 2 is a schematic block diagram for one of the tire condition sensor units shown in FIG. 1.

FIG. 2 schematically illustrates a tire condition sensor unit 16 (generically shown without alphabetic suffixes on the reference numerals), in accordance with one exemplary embodiment of the present invention. Specifically, the tire condition sensor unit 16 may include a receiver 32 (shown in phantom) operatively connected 34 to a controller 36, depending on the type of identification system used. The controller 36, in accordance with an exemplary embodiment, is a microcomputer having a combination of a microprocessor and/or microcontroller in a single integral chip or separately connected. Alternatively, the controller 36 may be formed from discrete circuitry, an ASIC, or any other type of control circuitry. The controller 36 is further operatively connected 38, 40 to one or more sensors 42 and transmitter 44, respectively. The transmitter 44 is operatively connected 45 to antenna 20 for sending the transmission signal 22 to the vehicle-based unit 24. In the illustrated embodiment, the receiver 32 in response to an initiation signal (not shown) enables the controller 36 for receiving sensory information from the one or more sensors 42 that are operatively connected 38 to the controller 36.

In an alternative embodiment, the tire condition sensor unit 16 may include memory 46 (shown in phantom), such as a read-only memory (ROM) relating to the tire condition sensor's identity operatively connected 48 to a controller 36. In such an embodiment, the transmission signal 22 sent from the antenna 20 includes, in addition sensory information, a signature for identifying the associated tire condition sensor unit 16 in the data packet ("tire ID"), and is periodically or randomly sent without the need of stimuli or receiver 32.

The controller 36 includes a life sensing algorithm 50 that estimates the remaining functional life of the power supply (e.g., 18a). In general, the life sensing algorithm 50 tracks the current used over time by sensor unit components 54 of the tire condition control unit 16. The sensor unit components 54 include any components that use power from the power supply (e.g., 18a) in the tire control sensor (e.g., 16a), including but not limited to, the receiver 32, controller 36, sensors 42, and transmitter 44. The life sensing algorithm 50 monitors the operations performed by each of the sensor unit components 54 and increments a counter 56 for each operation performed that has a significant energy usage.

The amount of energy used is known for each operation performed by the sensor unit components 54. The life sensing algorithm 50 includes assigned energy values 58 relating to the known energy usage by the sensor unit components 54. For example, the life sensing algorithm 50 could have a look-up table with a current assigned energy values 58 for each operation performed. The life sensing algorithm 50 may include only the assigned values 58 for operations that have significant energy usage. Alternatively, the life sensing algorithm 50 may include assigned values 58 for all operations performed in the tire control sensor units (e.g., 16a). A prescribed threshold 59 (e.g., counting energy usage (amp second)) is then used, which can be varied by modifying the life sensing algorithm 50 for determining the amount of amp second, constituting a significant energy usage. Only the assigned values 58 greater than or equal to the prescribed threshold 59 are then counted by the life sensing algorithm 50 in the counter 56.

The known energy usage for the sensor unit components 54 relating to the assigned values 58 are known from the components specification sheets or from testing the amount of energy used during operation. For example, transmission of a signal (e.g., 22a) may use 2 micro amp seconds, while the measuring of sensory information by one of the sensors 42 may use 1 micro amp second.

In one embodiment the counter 56 is incremented an equal amount (for example a single unit) for each operation performed by the various sensor unit components 54 that have a significant energy draw. In a separate embodiment, the counter 56 is incremented an amount proportional to the amount of energy used when the operation performed has a significant energy draw. Using the above example, transmitting a transmission signal (e.g., 22a) would increase the count in the counter 56 by two energy increments compared to increasing the count of the counter by one increment for the amount of energy used in measuring sensory information by one of the sensors 42.

When the counter 56 reaches a prescribed limit 60 near the end of the power supply's (e.g., 18*a*) useful life, the tire condition sensor (e.g., 16*a*) transmits a message that alerts the vehicle-based unit 24. The vehicle-based unit 24 then alerts the driver through, for example an audio message or the display 30 that the tire condition sensor (e.g., 16*a*) requires servicing.

Figure 3:
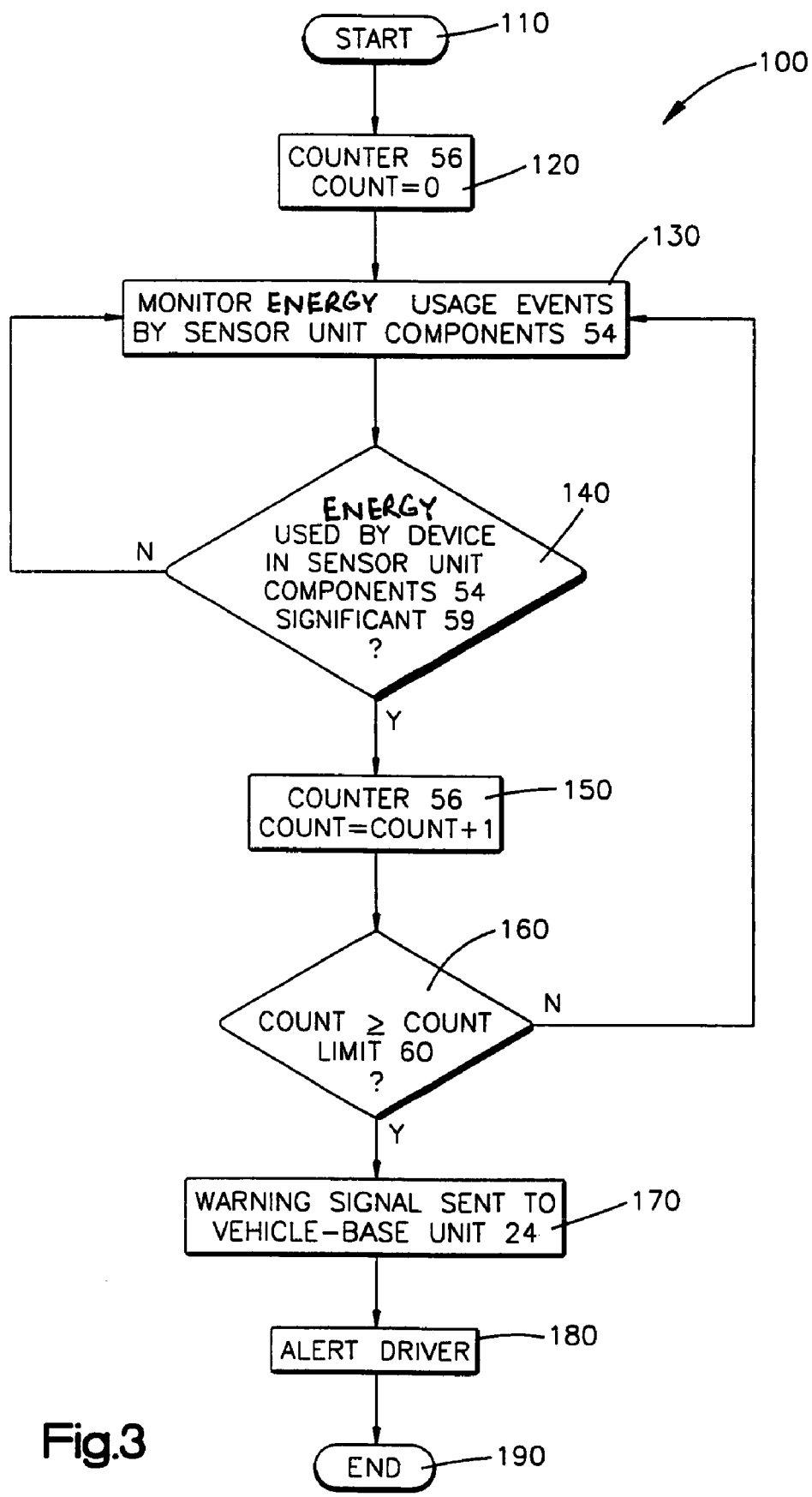
FIG. 3 is a flow chart of one embodiment illustrating a control process performed within a tire condition sensor unit in accordance with an example embodiment of the present invention.

FIG. 3 is a flow chart illustrating a process 100 for estimating the remaining useful life of power supply (e.g., 18*a*) performed within the tire condition sensor unit (e.g., 16*a*). The process 100 is initiated at step 110 and proceeds to step 120 were the counter 56 is initialized. The counter 56 can be formed in the computer readable media found in the controller 36 or formed from discrete circuitry separate from the controller or a combination thereof. At step 130, the life sensing algorithm 50 monitors operations performed by each of the sensor unit components 54 during operation of the tire condition sensor unit (e.g., 16*a*). At step 140, a determination is made by the life sensing algorithm 50 on whether the energy used by each of the sensor unit components 54 being monitored at step 130 was significant. A significant energy usage results from a plurality of functions performed by various sensor unit components 54 that are known and identified in the life sensing algorithm 50 to have relatively considerable amount of energy, influencing the life of the power supply (e.g., 18*a*).

If the determination by the life sensing algorithm 50 of step 140 is in the negative, that is the energy usage of a particular sensor unit component 54 is insignificant (below the prescribed threshold 59), no change is made to the counter 56, and the life sensing algorithm 50 continues to monitor the energy use in each of the sensor unit components 54 at step 130. If the determination by the life sensing algorithm 50 of step 140 is in the affirmative, that is, the energy usage of a particular sensor unit component is significant (above the prescribed threshold 59), the count in the counter 56 is incremented at step 150.

Process step 160 determines whether the count value in the counter 56 produced at step 150 exceeds the prescribed limit 60. The prescribed limit 60 is a variable that is programmed into computer readable media such as software or firmware embedded into a microprocessor or microcontroller of the controller 36 into for example, flash Read Only Memory (ROM) or as a binary image file that can be programmed by a user. Alternatively, the prescribed limit 60 is a variable controlled by discrete circuitry.

If the determination of step 160 is in the negative, that is the count value is less than the prescribed limit 60, the process 100 continues to monitor the energy sensing devices at step 130. If the determination of step 160 is in the affirmative, that is the count value is greater than or equal to the prescribed limit 60, the controller 36 will send the transmission signal 22 to the vehicle-based unit 24 at step 170. The transmission signal (e.g., 22*a*) at step 170 will include information in the data packet sent, warning that the life expectancy of the power supply 18 is approaching an end or that the tire condition control sensor unit (e.g., 16*a*) is in need of servicing. The transmission signal (e.g., 22*a*) may also include sensory information and signature information. At step 180 the driver is alerted as to which tire condition sensor (e.g., 16*a*) is approaching the end of its expected life, by for example and audible notice or by the display 30.

FIG. 4 illustrates an alternative example embodiment of the process 100 having identical steps and identical reference numerals with the addition of a prime. It should be appreciated that, except as noted, all of the steps function the same for those steps having the same reference numerals and for brevity, only the steps of the alternative embodiment different from FIG. 3 are discussed for FIG. 4.

Upon determination by the life sensing algorithm 50 of step 140' is in the affirmative, that is the energy usage of a particular sensor unit component is significant (above the prescribed threshold 59), a look up increment rate (R) for assigned values 58 occurs at step 142. A table is used at step 144, which provides a list of sensor unit components 54 operations and their respective assigned values 58 represented as A, B, C, and D. The table at step 144 provides only a sampling of sensor unit component 54 operations, and could include any operation that uses energy during operation of the tire condition sensor (e.g., 16*a*) without departing from the spirit and scope of the claimed invention.

The assigned values 58 represented as A, B, C, and D are proportional to the known amount of energy used by each sensor during a particular function. The respective assigned value A, B, C, or D is assigned to the increment rate (R) for the function performed by the component evaluated at step 140'. The count in the counter 56 is then incremented by the increment rate (R) at step 146. The count is then evaluated against a count limit 60 at step 160' and continues thereon, identical to the process 100 described in FIG. 4.

From the above description of the invention, those skilled in the art will perceive improvements, changes and modifications. For example, it should be understood by those skilled in the art that energy used by the sensor unit components 54 instead of being assigned known energy values could be measured values by the controller 36 or separate discrete circuitry in determining whether the energy usage is significant. Such improvements, changes and modifications within the skill of the art are intended to be covered by the appended claims.

Having described the invention, the following is claimed:

1. A system for monitoring life expectancy of a remote tire monitoring sensor comprising:
   a tire-based unit having a sensor that receives power from a power supply located within said tire-based unit, the sensor used to detect at least one tire parameter;
   a transmitter located within the tire-based unit that receives power from said power supply that transmits a signal relating to the parameter measured by said sensor;
   a controller that evaluates the life of said power supply by monitoring energy usage of the power supply by counting the number of occurrences in which said energy usage is above a prescribed amount and comparing the number of occurrences to a threshold.

2. The system of claim 1 wherein said controller includes a counter that is incremented for each of said occurrences an amount proportional to the energy usage of the power supply.

3. The system of claim 1 wherein said controller further comprises an algorithm having a listing of energy usage values for each operation performed by components located in said tire-based unit, including said sensor, transmitter, and controller, said values being used in monitoring the energy usage of the power supply.

4. The system of claim 1 further comprising a signal sent from said transmitter to a vehicle-based unit indicating that said tire-based unit requires servicing when said number of occurrences exceeds said threshold.

5. The system of claim 3 wherein said listing of energy usage values are above said prescribed amount, producing an occurrence counted by said controller for each operation performed on the listing by said components in said tire-based unit.

6. The system of claim 5 wherein said prescribed amount is a variable prescribed amount such that only energy usage values on said listing above said variable prescribed amount produce an occurrence counted by said controller.

7. A system for monitoring a power supply located within a tire condition monitoring unit comprising:
  a plurality of components located within said tire condition monitoring unit, including at least one sensor used to measure at least one tire parameter, a transmitter for transmitting signals relating to the tire parameters measured by said sensor, and a controller for controlling said sensor and transmitter;
  the controller further including an algorithm for monitoring the power supply by tracking the energy usage for each operation performed by said plurality of components; and
  wherein said algorithm further comprises a prescribed energy threshold and tracking only energy usage greater than said prescribed energy threshold for each operation performed by said plurality of components.

8. The system for monitoring a power supply of claim 7 wherein said plurality of components comprises a receiver.

9. The system for monitoring a power supply of claim 7 wherein said algorithm comprises a prescribed energy threshold formed by a listing of known energy values for particular operations performed by said plurality of components, the algorithm tracking only energy usage found on the prescribed energy threshold listing.

10. The system for monitoring a power supply of claim 7 wherein said algorithm comprises a counter that is incremented for each energy usage greater than said prescribed energy threshold.

11. The system for monitoring a power supply of claim 10 wherein said counter is incremented proportionally to the energy usage being tracked.

12. The system for monitoring a power supply of claim 10 wherein said energy usage being tracked is produced from a look-up table.

13. A method of monitoring a power supply located in a tire condition monitoring system comprising:
  monitoring energy usage of operations performed by a plurality of components located within said tire condition monitoring system;
  referencing a respective known value for said monitored energy usage for each operation performed by said plurality of components, the known energy values being in an algorithm located in a controller of the tire condition monitoring system;
  incrementing a counter for each known energy value referenced to an incremented count value; and
  comparing said incremented count value to a count limit.

14. The method of claim 13 further comprising the step of transmitting a warning signal from a transmitter located within said tire condition monitoring system when said count value is greater than said count limit.

\* \* \* \* \*